(12) United States Patent
Moravek et al.

(10) Patent No.: US 10,403,059 B2
(45) Date of Patent: *Sep. 3, 2019

(54) DISTRIBUTED VEHICLE MONITORING SYSTEMS AND METHODS

(71) Applicant: HONEYWELL INTERNATIONAL INC., Morris Plains, NJ (US)

(72) Inventors: Patrik Moravek, Brno (CZ); Jan Beran, Brno (CZ); Robert Kalmar, Brno (SK)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,275

(22) Filed: Jun. 5, 2017

(65) Prior Publication Data
US 2018/0350165 A1 Dec. 6, 2018

(51) Int. Cl.
*B64F 5/60* (2017.01)
*G07C 5/00* (2006.01)
(Continued)

(52) U.S. Cl.
CPC ............ *G07C 5/085* (2013.01); *B64F 5/60* (2017.01); *G07C 5/008* (2013.01); *G07C 5/0808* (2013.01);
(Continued)

(58) Field of Classification Search
CPC ..... B64F 5/06; B64C 2201/024; G07C 5/008; G07C 5/0808; G07C 5/085
(Continued)

(56) References Cited

U.S. PATENT DOCUMENTS

| 5,239,468 A | 8/1993 | Sewersky et al. |
| 6,055,468 A * | 4/2000 | Kaman .................. G07C 5/008 340/439 |

(Continued)

FOREIGN PATENT DOCUMENTS

| DE | 102009054232 A1 | 5/2011 |
| EP | 2433866 A2 | 3/2012 |

(Continued)

OTHER PUBLICATIONS

USPTO Office Action for U.S. Appl. No. 14/465,609 dated Oct. 4, 2017.
(Continued)

*Primary Examiner* — Atul Trivedi
(74) *Attorney, Agent, or Firm* — Lorenz & Kopf, LLP

(57) ABSTRACT

Distributed monitoring systems and methods are provided for monitoring a vehicle, such as a rotorcraft. One exemplary system includes a plurality of sensor management modules onboard the vehicle and coupled to respective sensing arrangements mounted onboard the vehicle to provide measurement data corresponding to a respective mechanical component. A mobile device is communicatively coupled to the management modules over a wireless network associated with the vehicle. The mobile device configures the management modules for sampling their sensing arrangements, receives the measurement data obtained in accordance with the configuration information from the management modules, determines the condition of the respective mechanical components based on the corresponding measurement data, and displays a graphical representation of the condition of the respective mechanical component.

19 Claims, 3 Drawing Sheets

(51) Int. Cl.
  *G07C 5/08* (2006.01)
  *H04Q 9/00* (2006.01)
  *G08C 17/02* (2006.01)

(52) U.S. Cl.
  CPC ............ *G07C 5/0825* (2013.01); *H04Q 9/00* (2013.01); *G07C 2205/02* (2013.01); *G08C 17/02* (2013.01); *H04Q 2209/40* (2013.01)

(58) Field of Classification Search
  USPC ...................................................... 701/33.2
  See application file for complete search history.

(56) References Cited

U.S. PATENT DOCUMENTS

| | | | |
|---|---|---|---|
| 6,219,597 | B1 | 4/2001 | Longere |
| 6,366,311 | B1 | 4/2002 | Monroe |
| 6,842,460 | B1 | 1/2005 | Olkkonen |
| 7,276,703 | B2 | 10/2007 | Berkcan et al. |
| 7,489,992 | B2 | 2/2009 | Valette et al. |
| 8,200,376 | B2 | 6/2012 | Mattingly et al. |
| 8,346,411 | B1 | 1/2013 | Dirks et al. |
| 8,402,844 | B2 | 3/2013 | Zakrzewski et al. |
| 8,618,928 | B2 | 12/2013 | Weed et al. |
| 8,777,800 | B2 | 7/2014 | Morel |
| 9,026,336 | B2 | 5/2015 | Ziarno |
| 9,043,073 | B2 | 5/2015 | Ricci |
| 9,485,605 | B2 | 11/2016 | Beran et al. |
| 9,536,149 | B1* | 1/2017 | Cesarano ............ G05D 1/0214 |
| 2004/0203379 | A1 | 10/2004 | Witkowski et al. |
| 2005/0032550 | A1 | 2/2005 | Baratono et al. |
| 2005/0220113 | A1 | 10/2005 | Skalecki |
| 2006/0004499 | A1 | 1/2006 | Trego et al. |
| 2007/0135977 | A1 | 6/2007 | Mindeman |
| 2008/0036187 | A1* | 2/2008 | Breed ............... B60R 21/01516 |
| | | | 280/735 |
| 2008/0137590 | A1 | 6/2008 | Stott |
| 2009/0152391 | A1* | 6/2009 | McWhirk ................. B64B 1/02 |
| | | | 244/30 |
| 2009/0211381 | A1 | 8/2009 | Zakrzewski et al. |
| 2010/0073197 | A1 | 3/2010 | Eagleton et al. |
| 2011/0066297 | A1* | 3/2011 | Saberi ................... F16K 31/046 |
| | | | 700/287 |
| 2011/0098879 | A1 | 4/2011 | Basir et al. |
| 2011/0125419 | A1* | 5/2011 | Bechhoefer ............. F03D 7/047 |
| | | | 702/34 |
| 2011/0195656 | A1 | 8/2011 | Owyang et al. |
| 2011/0276218 | A1 | 11/2011 | Dwan et al. |
| 2011/0299470 | A1 | 12/2011 | Muller et al. |
| 2012/0078544 | A1 | 3/2012 | Lynch et al. |
| 2012/0095622 | A1 | 4/2012 | Lynch et al. |
| 2012/0101776 | A1 | 4/2012 | Brower et al. |
| 2013/0073259 | A1 | 3/2013 | Safa-Bakhsh et al. |
| 2013/0190943 | A1 | 7/2013 | Wester et al. |
| 2013/0204487 | A1 | 8/2013 | Ovens |
| 2013/0232237 | A1 | 9/2013 | Zulch, III et al. |
| 2014/0036686 | A1 | 2/2014 | Bommer et al. |
| 2014/0061382 | A1 | 3/2014 | Tucker |
| 2014/0067244 | A1 | 3/2014 | Baker |
| 2014/0075356 | A1 | 3/2014 | Gray et al. |
| 2015/0321768 | A1 | 11/2015 | Kumar et al. |
| 2015/0363981 | A1 | 12/2015 | Ziarno et al. |
| 2015/0369742 | A1* | 12/2015 | Tamada .................. G01N 21/65 |
| | | | 356/301 |
| 2016/0055685 | A1* | 2/2016 | Lilly .................... G07C 5/0808 |
| | | | 701/1 |
| 2016/0090055 | A1 | 3/2016 | Breed |
| 2016/0125740 | A1 | 5/2016 | Pasko et al. |
| 2016/0152321 | A1* | 6/2016 | D'Andrea ............... B64C 27/20 |
| | | | 701/3 |
| 2016/0221671 | A1* | 8/2016 | Fisher ..................... B64C 27/08 |
| 2018/0350165 | A1* | 12/2018 | Moravek ................ G07C 5/085 |

FOREIGN PATENT DOCUMENTS

| | | |
|---|---|---|
| WO | 2012021202 A2 | 2/2012 |
| WO | 2014018288 A1 | 1/2014 |

OTHER PUBLICATIONS

Barrera et al.; Structural Health Monitoring Network System with Wireless Communications Inside Closed Aerospace Structures; 6th European Workshop on Structural Health Monitoring—Tu.3.A.3; Corresponding author: Eduardo Barrera, Instrumentation and Applied Acoustic Research Group. Technical University of Madrid (UPM). Ctra. Valencia, Km. 7. 28031, Madrid, Spain.

Sampigethaya et al.; Secure Operation, Control,and Maintenance of Future E-Enabled Airplanes; Proceedings of the IEEE | vol. 96,No. 12, Dec. 2008.

Intelligent Automation, Inc.; IAI awarded $4 million by the Air Force to develop a Damage Registration Tool for High-Performance Aircraft; © 2008-2014 Intelligent Automation, Inc. | 115400 Calhoun Drive, Suite 190, Rockville, MD.

Yi et al.; Wireless Sensor Network for Structural Health Monitoring using System-on-Chip with Android Smartphone; Department of Electrical and Computer Engineering Illinois Institute of Technology, Chicago IL,USA; 978-1-4673-4642-9/13 © 2013 IEEE.

EP Extended Search Report for Application No. EP 15180663.5 dated Jan. 29, 2016.

Extended EP Search Report for Application No. 18173934.3 dated Sep. 19, 2018.

USPTO Final Office Action for U.S. Appl. No. 14/465,609 dated May 18, 2018.

Angadi, Arunakumar, Ryan Dias and Mohmad Umair Bagali, "An Aircraft Health Monitoring System Using IOT," Indian Journal of Science and Technology, vol. 9(33), Sep. 2016, www.indjst.org.

Tedavalli, Rama, and Rohit K. Belapurkar, "Application of Wireless Sensor Networks to Aircraft Control and Health Management Systems," J Control Theory Appl, Oct. 18, 2010, p. 28-33.

USPTO Notice of Allowance for U.S. Appl. No. 14/465,609 dated Aug. 15, 2018.

* cited by examiner

DISTRIBUTED VEHICLE MONITORING SYSTEMS AND METHODS

TECHNICAL FIELD

The subject matter described herein relates generally to vehicle systems, and more particularly, embodiments of the subject matter relate to monitoring rotorcraft and other avionics systems using a mobile electronic device and a distributed sensing topology.

BACKGROUND

Vehicle and aviation communities continually attempt to achieve improved safety and reduced operating costs. Health and Usage Monitoring Systems (HUMS) monitor the drive train and other vehicle and aircraft component's health using specialized measurements and diagnostics. For example, in the case of a helicopter or other rotorcraft, the rotating blades in a blade assembly as well as other mechanical components in the drive train, may be monitored as they experience bending, twisting, imbalances, misalignments, wear and other vibratory forces during flight, which, in turn, could lead to premature wear detrimental to mechanical integrity.

HUMS equipment may be installed onboard and wired to onboard sensors or systems to obtain measurement data pertaining to various mechanical components, which, in turn, may be processed and analyzed to characterize the condition of those components. For example, vibration measurements may be utilized by a Rotor Track and Balance (RTB) system that tracks vibration of rotors of the rotorcraft and takes corrective action to smooth such vibration. In such equipped rotorcraft, a tachometer and accelerometers may be placed in close proximity to a rotor but remotely from the HUMS. The accelerometers sense vibration due to the rotor and the tachometer detects angular speed and phase of the rotor and generates sensor data based thereon. The sensor data is then sent to the HUMS, typically over one or more wires. Thus, traditional HUMS installations can be heavy, costly, and susceptible to other problems.

Typically, HUMS data is then subsequently transferred, via a physical connection, to another device which may further process the data and generate graphical displays based on the data that can be reviewed by a pilot, crew chief, HUMS manager, or the like. However, this process can be time consuming and require a user have the appropriate hardware (e.g., the necessary cables for connecting to the HUMS box and access to a ruggedized portable computer with the necessary software for processing the HUMS data).

In view of the foregoing, it is desirable to enable HUMS data to be reviewed in a more expeditious and convenient manner to improve the efficiency of operations (or reduce operating costs) without compromising safety and while remaining in full compliance with regulatory or operational guidelines. Additionally, it is desirable to decrease costs, weight, and other drawbacks associated with traditional HUMS installations to increase proliferation of HUMS capabilities, and thereby, improved safety and operational outcomes resulting from increased adoption and retrofitting. Other desirable features and characteristics will become apparent from the subsequent detailed description and the appended claims, taken in conjunction with the accompanying drawings and the foregoing technical field and background.

BRIEF SUMMARY

Vehicle monitoring systems and methods are provided. In one embodiment, a monitoring system for a plurality of mechanical components of a vehicle includes a plurality of management modules onboard the vehicle and a mobile device communicatively coupled to the plurality of management modules over a wireless network. Each management module of the plurality of management modules is coupled to one or more sensing arrangements mounted onboard the vehicle to provide measurement data corresponding to a respective mechanical component of the plurality of mechanical components. The mobile device configures the plurality of management modules for sampling the one or more sensing arrangements to obtain the measurement data in accordance with monitoring configuration information and receives the measurement data from the plurality of management modules over the wireless network. For each mechanical component of the plurality of mechanical components, the mobile device determines a condition of the respective mechanical component based on the measurement data corresponding to the respective mechanical component and displays a graphical representation of the condition of the respective mechanical component.

In another embodiment, a method of monitoring health of a plurality of mechanical components of a vehicle involves configuring, by a mobile device using a wireless network associated with the vehicle, measurement parameters of a plurality of sensor management units onboard the vehicle, receiving, at the mobile device, measurement data from the plurality of sensor management units over the wireless network, determining, at the mobile device, conditions of the plurality of mechanical components based on the measurement data, and providing, at the mobile device, indicia of the conditions of the plurality of mechanical components. Each sensor management unit of the plurality of sensor management unit includes one or more sensor interfaces coupled to one or more sensors via one or more electrical connections and each sensor management unit utilizes its respective measurement parameters for obtaining measurement data from the one or more sensors at the one or more sensor interfaces.

In another embodiment, a method of monitoring health of a plurality of mechanical components of a rotorcraft using a plurality of sensor management modules distributed about the rotorcraft is provided. Each of the sensor management modules is communicatively coupled to a wireless network associated with the rotorcraft and each of the sensor management modules is associated with a set of one or more sensing arrangements for obtaining measurement data corresponding to a respective one of the plurality of mechanical components. The method involves providing, by a mobile device communicatively coupled to the wireless network, measurement configuration settings to each of the plurality of sensor management modules, wherein each of the plurality of sensor management modules obtains measurements from its set of sensing arrangements in accordance with its measurement configuration settings provided by the mobile device, receiving, at the mobile device over the wireless network, the measurements from each of the plurality of sensor management modules, characterizing, at the mobile device, a health of each of the plurality of mechanical components based on respective measurements from the respective sensor management module corresponding to the respective mechanical component, and displaying, at the mobile device, an indication of the health of each of the plurality of mechanical components.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

Figure 1:
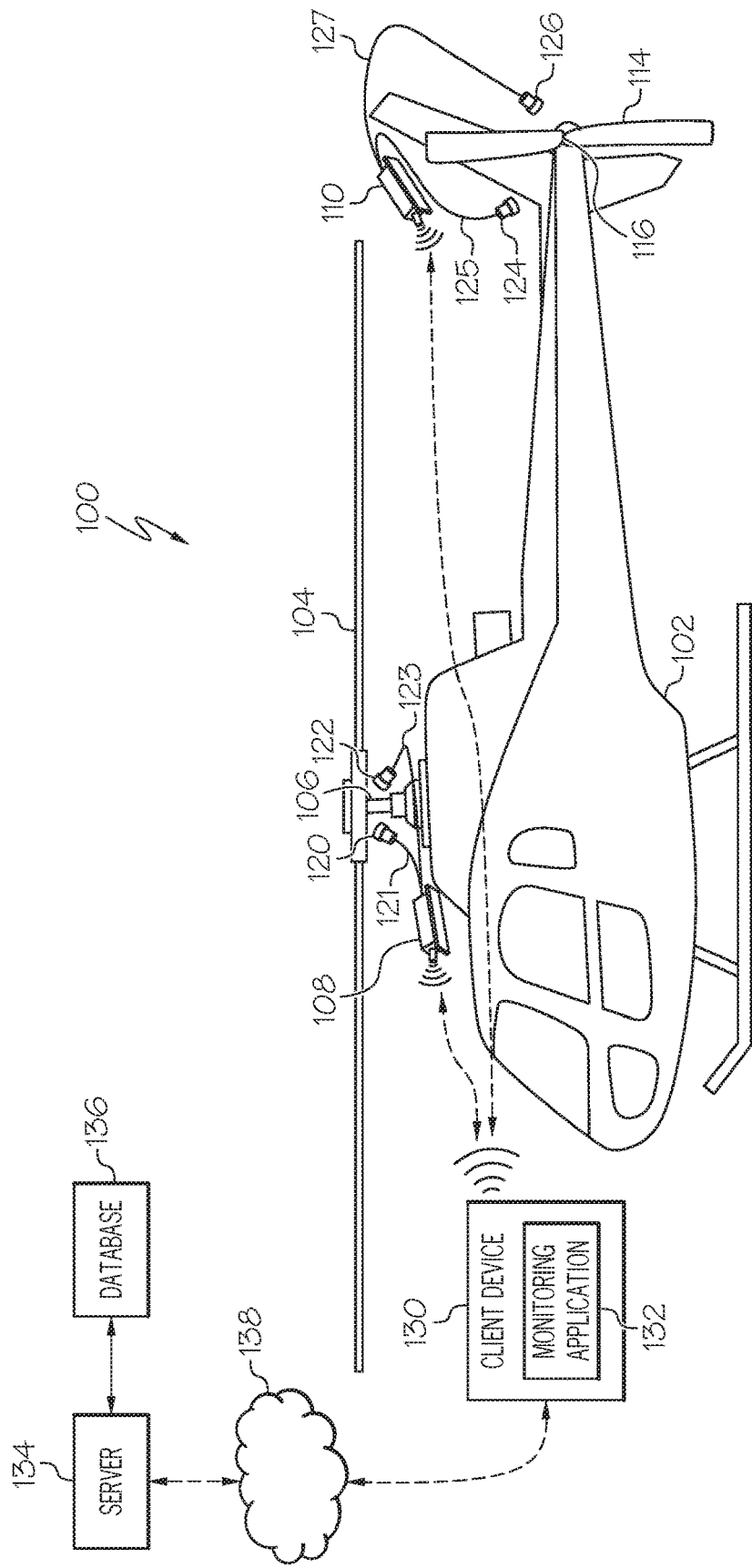
FIG. 1 is a block diagram illustrating a monitoring system for a rotorcraft in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to monitoring systems including sensing capabilities distributed throughout a vehicle near various mechanical components of the vehicle to obtain measurement data for monitoring those mechanical components. The measurement data is provided to a mobile device via a vehicle communications network. The mobile device processes or otherwise analyzes the data using one or more health and usage monitoring algorithms to determine and present information pertaining to the relative health or condition of the mechanical components onboard the vehicle. Thus, rather than relying on dedicated Health and Usage Monitoring Systems (HUMS) equipment onboard a vehicle, the HUMS analysis and related features may be implemented at the mobile device, which can reduce the weight and cost that could be otherwise associated with a HUMS installation (e.g., dedicated HUMS equipment and related cabling). The weight reduction is particularly advantageous for small aircraft, namely, small helicopters and other rotorcraft where the weight associated with dedicated HUMS hardware is prohibitive. Additionally, the mobile device is independent from installed avionics, which simplifies certifications (e.g., supplemental type certification (STC) and the like) and expands the range of installation possibilities to differently equipped aircraft.

Moreover, while some HUMS hardware could include a relatively limited number of input/output interfaces or have other limitations due to packaging or mechanical concerns, the computational capabilities of the mobile device may not be so constrained and the distributed monitoring system provided herein is similarly not constrained to any particular number of sensors or measurement channels supportable by the mobile device. The distributed nature of the architecture enables incremental installation of more sensing capabilities without modifications to previously installed hardware.

In exemplary embodiments, the mobile device configures the distributed sensing units to support synchronization of communications and/or measurements. In this regard, in some embodiments, the mobile device may initiate or otherwise trigger measurements dynamically and in real-time based on status information detected or otherwise identified at the mobile device, such as, for example, a current aircraft position, a current aircraft altitude, or the like. Measurements at the distributed sensing units can also be configured to be triggered or otherwise occur autonomously or based on information or data provided avionics or other onboard components. Additionally, a pilot or other user can utilize the mobile device to manually initiate measurements at the sensing units. The mobile device can also be utilized to upload or otherwise backup measurement data and/or related monitoring data to a remote server or other ground station for further distribution, analysis, and the like.

FIG. 1 depicts exemplary embodiments of a monitoring system 100 associated with a vehicle 102 for monitoring the condition or health of one of more mechanical components of the vehicle 102. While the subject matter described herein is not necessarily limited to any particular type of vehicle, for purposes of explanation, the subject matter may be described herein in the context of monitoring the condition of one or more blades, wings or other airfoils or the corresponding drive train components of a helicopter or other rotorcraft. In this regard, the rotorcraft 102 may include at least one rotor assembly having a plurality of blades that revolve around a mast or rotor actuated by a drive train assembly to provide lift or thrust. For example, in the illustrated embodiment, a first set of blades 104 rotate horizontally around a mast 106 located at or near a center of a fuselage of the rotorcraft 102. The blades 104 and mast 106 may be collectively referred to as a main rotor. The main rotor is controlled to provide lift for the rotorcraft 102. A second set of blades 114 rotate almost vertically around a mast 116 located at or near an end of a tail of the rotorcraft 102. The blades 114 and mast 116 may be collectively referred to as a tail rotor. The tail rotor is controlled to provide thrust for the rotorcraft 102.

It should be appreciated that FIG. 1 depicts a simplified representation of the monitoring system 100 for purposes of explanation, and FIG. 1 is not intended to limit the subject matter in any way. In this regard, the subject matter described herein is not intended to be limited to rotorcraft or any particular type of mechanical component, and in practical embodiments, may be implemented in an equivalent manner for other types of mechanical components of other types of aircraft or ground vehicles. As can be appreciated, various types of rotorcrafts include a varying number of rotors arranged at varying locations, and as such, the monitoring system 100 of the present disclosure is not limited to the present example shown in FIG. 1.

The illustrated monitoring system 100 includes a plurality of sensing arrangements (or sensors) 120, 122, 124, 126 that sense, measure, detect, or otherwise quantify one or more characteristics (or conditions) at their respective positions on the rotorcraft 102 during operation of the rotorcraft 102 and generate corresponding measurement data based thereon. In exemplary embodiments, onboard sensors 120, 122, 124, 126 sense, measure, detect, or otherwise quantify a characteristic that correspond to an operational characteristic (or condition) of one or more mechanical components of the rotorcraft 102 that the respective sensor 120, 122, 124, 126 is mounted on or near. Depending on the embodiment, the sensors 120, 122, 124, 126 could include one or more accelerometers, velometers (velocity sensors), proximity probes, tachometers, MEMS vibration sensors, or the like configured to quantify the rate or frequency at which the body, frame, fuselage, seats, or other mechanical component of rotorcraft 102 vibrates or otherwise oscillates during flight. One or more onboard sensors 120, 122, 124, 126 may also be coupled to or otherwise configured to measure operational, mechanical and/or performance characteristics of the engine(s), gearbox(es), transmission(s) or other mechanical components of the drive assembly that are mechanically coupled to the rotor assembly to rotate the rotor 106, 116 or blades 104, 114 during flight. Additionally, one or more sensors 120, 122, 124, 126 may be configured to measure or otherwise quantify the speed of rotation of the respective blades 104, 114 or the rotor 106, 116, the deflection or angle attack of the respective blades 104, 114, the imbalance of rotor 106, 116, the misalignment or excessive wear of shafts, gears and/or bearings, or other characteristics of the drive train assembly during flight. For purposes of explanation, "raw measurement data," "raw operational data," "raw flight data," or variants thereof may be used herein to refer to the unprocessed measurement data obtained via the onboard sensors 120, 122, 124, 126 that corresponds to the characteristic(s) of the mechanical component(s) of the rotor assembly, the drive assembly or other mechanical component(s) of the rotorcraft 102 that were measured during operation of the rotorcraft 102.

In exemplary embodiments, the sensors 120, 122, 124, 126 are distributed about the rotorcraft 102 and positioned on or near the rotary mechanical components of the rotorcraft 102 (e.g., the main and tail rotors) and associated with a corresponding supervisory management module 108, 110. The sensor management modules 108, 110 are capable of supporting multiple different sensors operating on different channels or via different electrical interfaces. In this regard, the management modules 108, 110 receive measurement data from their associated sensors 120, 122, 124, 126 via electrical connections 121, 123, 125, 127 (e.g., wires, cables, or the like) that connect the sensors 120, 122, 124, 126 to respective channel interfaces of the management modules 108, 110. The management modules 108, 110 also include one or more communications interfaces configured to support communications with a client device 130 over a communications network associated with the rotorcraft 102. In exemplary embodiments, the vehicle communications network is realized as a wireless local area network (WLAN), with the management modules 108, 110 including transceivers that communicate data according to a wireless communication protocol. For purposes of explanation, the management modules 108, 110 are alternatively referred to herein as wireless measurement units (WMUs).

The client device 130 generally represents an electronic device communicatively coupled to the wireless network associated with the rotorcraft 102. In exemplary embodiments, the client device 130 is realized as a mobile device that is distinct or separate from the rotorcraft 102. In practice, the client device 130 can be realized as any sort of mobile computing device, mobile telephone, smartphone, laptop, tablet, personal computer or other network-enabled electronic device. In exemplary embodiments, the client device 130 includes a display device capable of graphically presenting data and/or information along with one or more user input devices capable of receiving input from the user of the client device 130. In exemplary embodiments, the client device 130 includes a processing system that includes or is otherwise coupled to a data storage element having programming instructions or code that, when read and executed, cause the processing system to generate or otherwise facilitate a monitoring application 132 on the client device 130. As described in greater detail below, the monitoring application 132 supports wireless communications with the WMUs 108, 110 and performs one or more health and usage monitoring processes or algorithms to characterize the condition of the mechanical components 104, 106, 114, 116 based on measurement data received from the sensors 120, 122, 124, 126 via the WMUs 108, 110.

In one embodiment, the monitoring application 132 performs rotor track and balance (RTB) analysis. For example, the sensors 120, 122 supported by the WMU 108 may include a tachometer that measures speed and acceleration of the rotating blades 104 and one or more accelerometers that measure vibrations caused by the rotating blades 104. Similarly, the sensors 124, 126 supported by the WMU 110 may include a tachometer that measures speed and acceleration of the rotating blades 114 and one or more accelerometers that measure vibrations caused by the rotating blades 114. The monitoring application 132 receives the speed and acceleration measurement data from the respective WMUs 108, 110 and analyzes the measurement data to characterize the track of the blades 104, 114 and any imbalances that may require maintenance. Although not illustrated in FIG. 1, in some embodiments, actuation arrangements including a combination of hardware, firmware and/or other mechanical components may be associated with the rotor assemblies of the rotorcraft 102 and communicatively coupled to the client device 130 via the wireless network associated with the rotorcraft 102. The client device 130 may then transmit or otherwise provide commands, to an actuation arrangement via the wireless network, that allow the client device 130 to modify or otherwise adjust the rotor assemblies (e.g., perform rotor track and balance adjustments) in a manner that is influenced by the measurement data received from the sensors 120, 122, 124, 126 to reduce vibrations of the rotorcraft 102 or otherwise mitigate wear and tear or other undesirable physical effects on the mechanical components of the rotorcraft 102.

Still referring to FIG. 1, in exemplary embodiments, the client device 130 is communicatively coupled to a communications network 138 that is separate and distinct from the wireless network associated with the rotorcraft 102, and furthermore, in some embodiments, the WMUs 108, 110 or other components or systems onboard the rotorcraft 102 may be incapable of communicating over the network 138. In the embodiment of FIG. 1, the network 138 is any communications network (or a combination of communications networks) capable of transmitting data between the client device 130 and a remote computing system, such as, for example, a server 134 or other computer at a ground-based station. In various embodiments, network 138 includes any number of public or private data connections, links or networks supporting any number of communications protocols. Network 138 may include a cellular communications network, the Internet, or any other network.

In one or more embodiments, the code or programming instructions corresponding to the monitoring application 132 are downloaded or retrieved via a network 138 (e.g., from the server 134 or another networked host) and installed at the client device 130. In other embodiments, the code or programming instructions corresponding to the monitoring application 132 may be retrieved on an as-needed basis at run-time (e.g., from the server 134 via network 138). That said, in other embodiments, the monitoring application 132 may be realized as a standalone application installed locally at the client device 130.

Still referring to FIG. 1, the server 134 may be realized as one or more server computers or other device(s) coupled to the network 138. The server 134 may be implemented with a server computer system or data processing system that is based upon any processor, architecture and/or operating system, and will typically be implemented using any sort of processing system, memory and input/output features. Various embodiments may be implemented using dedicated or shared hardware servers; other implementations may make use of virtual server features as part of a "cloud computing" service. In the illustrated embodiment, the server 134 is communicatively coupled to a database 136 for storing or otherwise maintaining measurement data, monitoring data, health and usage data, and the like associated with various instances of rotorcraft 102, which is received by the server 134 from the respective instances of client devices 130 paired with those rotorcraft 102. In this regard, the server 134 may manage flight logs and support more detailed analysis using a more comprehensive data set that includes data from previous flights that may not be available at the client device 130. For example, the server 134 may store data received from the monitoring application 132 on the client device 130 into corresponding flight log data sets in the database 136, and then subsequently retrieve and analyze the historical flight log data sets corresponding to multiple flights or instances of operation of the rotorcraft 102 to discern trends in the operational characteristics or health of the mechanical components of the rotorcraft 102. GUI displays can then be generated (e.g., at the ground-based station or the client device 130) that present the results of the analysis and/or allow a user to perform a detailed review the measurement data encapsulated by the flight log data.

Figure 2:
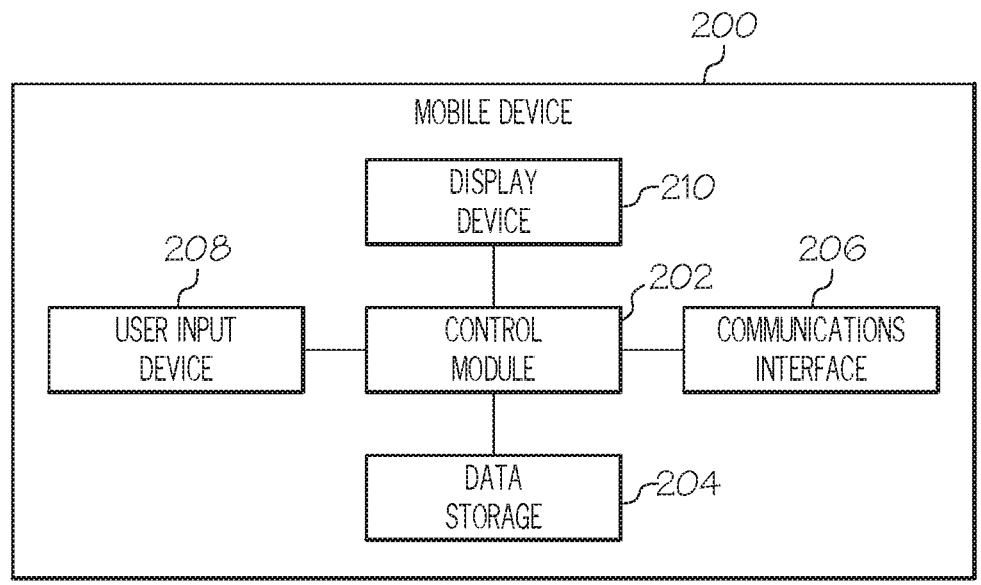
FIG. 2 is a block diagram illustrating a mobile device suitable for use in the monitoring system of FIG. 1 in accordance with one or more exemplary embodiments.

FIG. 2 depicts an exemplary embodiment of a mobile electronic device 200 suitable for use as the client device 130 in the monitoring system 100 of FIG. 1. The illustrated electronic device 200 includes, without limitation, a control module 202, a data storage element or memory 204, a communications interface 206, a user input device 208 and a display device 210. It should be understood that FIG. 2 is a simplified representation of the mobile device 200 for purposes of explanation and ease of description, and FIG. 2 is not intended to limit the subject matter in any way.

The control module 202 generally represents the hardware, circuitry, logic, firmware and/or other components of the mobile device 200 configured to perform the various tasks, operations, functions and/or operations described herein. Depending on the embodiment, the control module 202 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, designed to perform the functions described herein. Furthermore, the steps of a method or algorithm described in connection with the embodiments disclosed herein may be embodied directly in hardware, in firmware, in a software module executed by the control module 202, or in any practical combination thereof. In this regard, the data storage element (or memory) 204 represents any non-transitory short or long term storage media capable of storing programming instructions for execution by the control module 202, which, when read and executed by the control module 202, cause the control module 202 to perform certain tasks, operations, functions, and processes described herein. For example, the data storage element 204 may include code or other computer-executable programming instructions that, when read and executed by the control module 202, cause the control module 202 to implement or otherwise generate the monitoring application 132.

In the illustrated embodiment, the communications interface 206 generally represents the hardware, software, firmware and/or combination thereof that is coupled to the control module 202 and cooperatively configured to support wireless communications to/from the mobile device 200 via a wireless network associated with the rotorcraft 102 in a conventional manner. For example, the communications arrangement may include at least one transceiver module configured to support communications on the vehicle wireless network. The user input device 208 generally represents a touchscreen, a touch panel, a keyboard, a key pad, a mouse, a joystick, a directional pad, a motion sensor, or any other suitable user input device or combinations thereof. The display device 210 generally represents an electronic display (e.g., a liquid crystal display (LCD), a light emitting diode (LED) display, or the like), a monitor, a screen, or the like that is configured to graphically display data and/or information under control of the control module 202.

Figure 3:
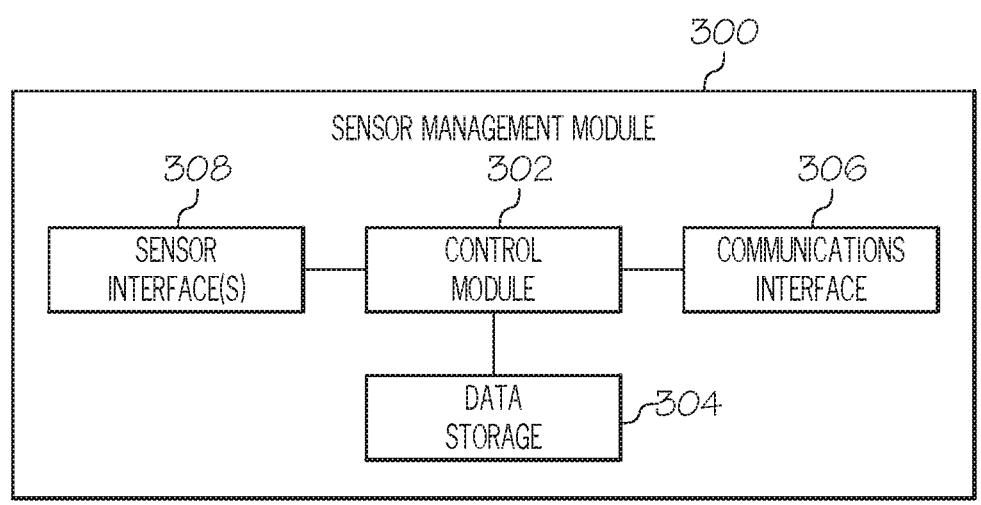
FIG. 3 is a block diagram illustrating a sensor management module suitable for use in the monitoring system of FIG. 1 in accordance with one or more exemplary embodiments.

FIG. 3 depicts an exemplary embodiment of a sensor management module 300 suitable for use as a management module 108, 110 in the monitoring system 100 of FIG. 1. The illustrated sensor management module 300 includes, without limitation, a control module 302, a data storage element or memory 304, a communications interface 306, and one or more input/output (I/O) interfaces 308 for communicating with associated sensors. It should be understood that FIG. 3 is a simplified representation of the sensor management module 300 for purposes of explanation and ease of description, and FIG. 3 is not intended to limit the subject matter in any way.

The control module 302 generally represents the hardware, circuitry, logic, firmware and/or other components of the sensor management module 300 configured to perform the various tasks, operations, functions and/or operations described herein in connection with the WMUs 108, 110. Depending on the embodiment, the sensor management module 300 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, designed to perform the functions described herein. The control module 302 includes or otherwise accesses a data storage element (or memory) 304 that stores code or other computer-executable programming instructions along with configuration data that are executed or otherwise utilized by the control module 302 to support the subject matter described herein.

In the illustrated embodiment, the communications interface 306 generally represents the hardware, software, firmware and/or combination thereof that is coupled to the control module 302 and cooperatively configured to support wireless communications to/from the sensor management module 300 via a wireless network associated with the rotorcraft 102 in a conventional manner. For example, the communications arrangement may include at least one transceiver module configured to support communications on the vehicle wireless network.

The I/O interfaces 308 generally represent the ports, terminals, sockets, connectors, or the like and related hardware for coupling the sensor management module 300 to one or more sensors via an electrical interconnection (e.g., wires 121, 123, 125, 127), which, depending on embodiment, could be any sort of bus, cable, wiring, or other interconnect. Accordingly, the interfaces 308 may alternatively be referred to herein as sensor interfaces 308. In practice, the number of sensor interfaces 308 provided in or on a housing of the sensor management module 300 may correspond to the number of measurement channels supported by the sensor management module 300. In some embodiments, for each sensor interface 308, the control module 302 include a corresponding analog-to-digital converter (ADC) or similar sampling arrangement to sample or otherwise obtain an analog measurement signal from a sensor at the sensor interface 308 and convert the analog measurement signal into a digital measurement value. That said, in other embodiments, a sensor coupled to a sensor interface 308 may include its own ADCs or sampling arrangements, such that the input received at the sensor interface 308 is a digital measurement value. In such embodiments, the control module 302 may configure the sensor to perform sampling in accordance with configuration information or commands received from the monitoring application 132, as described in greater detail below in the context of FIG. 4.

Figure 4:
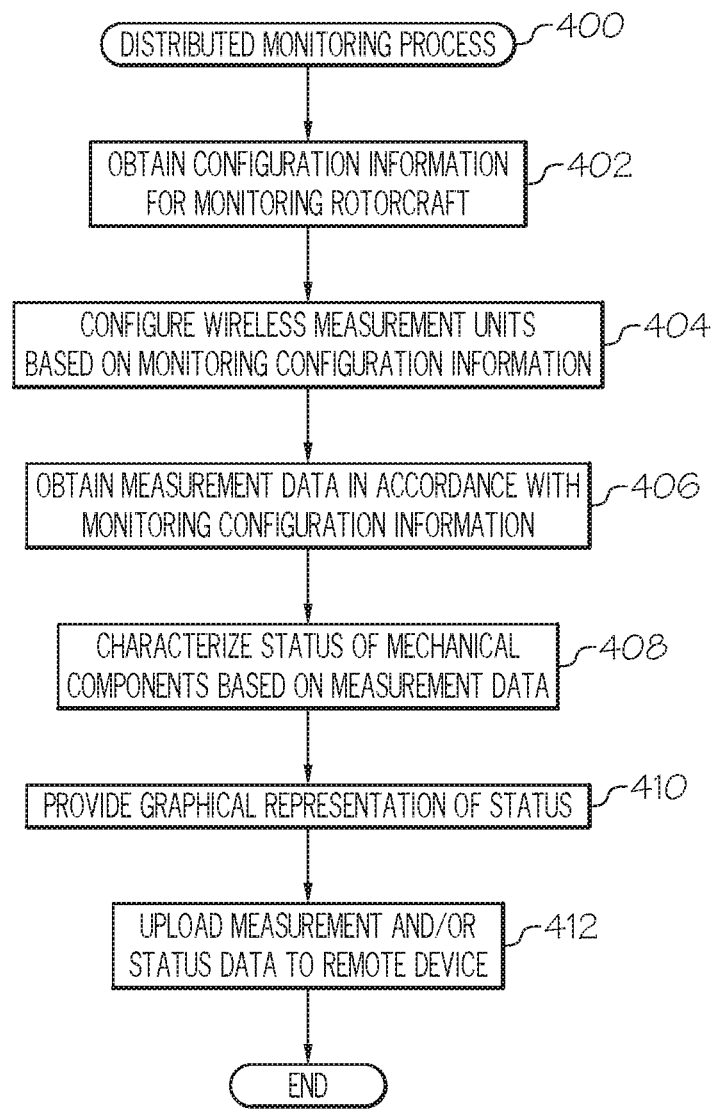
FIG. 4 is a flow diagram illustrating a distributed monitoring process suitable for implementation by the monitoring system of FIG. 1 in accordance with one or more exemplary embodiments.

Referring now to FIG. 4, in an exemplary embodiment, the monitoring system 100 is configured to support a distributed monitoring process 400 and perform additional tasks, functions, and operations described below. The various tasks performed in connection with the illustrated process 400 may be implemented using hardware, firmware, software executed by processing circuitry, or any combination thereof. For illustrative purposes, the following description may refer to elements mentioned above in connection with FIGS. 1-3. In practice, portions of the distributed monitoring process 400 may be performed by different elements of the monitoring system 100, such as, the WMUs 108, 110, 300, the sensors 120, 122, 124, 126, the client device 130, 200, the monitoring application 132, and/or the server 134. It should be appreciated that the distributed monitoring process 400 may include any number of additional or alternative tasks, the tasks need not be performed in the illustrated order and/or the tasks may be performed concurrently, and/or the distributed monitoring process 400 may be incorporated into a more comprehensive procedure or process having additional functionality not described in detail herein. Moreover, one or more of the tasks shown and described in the context of FIG. 4 could be omitted from a practical embodiment of the distributed monitoring process 400 as long as the intended overall functionality remains intact.

Referring now to FIGS. 1-4, the illustrated distributed monitoring process 400 begins by receiving or otherwise obtaining configuration information for monitoring the rotorcraft to be implemented during operation of the rotorcraft (task 402). In one embodiment, a user may utilize the client device 130 to input or otherwise provide, to the monitoring application 132 (e.g., via one or more GUI elements presented on a GUI display), information regarding how and when measurements should be obtained during flight, and from which particular sensors 120, 122, 124, 126 at which particular time or in response to a particular event or trigger. In other embodiments, the monitoring configuration information may be input or provided at a remote device 134 and downloaded to the client device 130 from the network 138 before flight. The monitoring configuration information may identify measurement configuration parameters or settings to be utilized when obtaining measurement data, such as, for example, sampling frequencies, sampling sequences or orders, sampling durations, triggering criteria for sampling, the number of samples to be obtained, gain factors associated with the samples from a respective sensor 120, 122, 124, 126, and potentially other information for operating and sampling the onboard sensors 120, 122, 124, 126. In this regard, monitoring configuration information may be utilized to configure the WMUs 108, 110, 300 and/or sensors 120, 122, 124, 126 for obtaining automated or autonomous measurements. Additionally, in some embodiments, the monitoring configuration information may be utilized to synchronize measurements across multiple WMUs 108, 110, 300 and/or sensors 120, 122, 124, 126 onboard the rotorcraft 102. For example, each of the WMUs 108, 110, 300 could be configured to obtain measurements from each of their associated sensors 120, 122, 124, 126 upon a particular event or trigger (e.g., the rotorcraft 102 reaching a particular altitude, airspeed, orientation, or the like).

The distributed monitoring process 400 continues by configuring the sensor management modules for operation in accordance with the monitoring configuration information (task 404). In this regard, the client device 130, 200 and/or monitoring application 132 communicates with the WMUs 108, 110, 300 over the vehicle wireless network to thereby configure the measurement parameters or settings of the WMUs 108, 110, 300 and their associated sensors 120, 122, 124, 126 for obtaining measurement data in accordance with the monitoring configuration information. In an exemplary embodiment, the client device 130, 200 and/or monitoring application 132 transmits or otherwise provides, to each of the WMUs 108, 110, 300 over the wireless network, a configuration file, which, in turn is stored or otherwise maintained by WMUs 108, 110, 300 in the respective file system associated with their data storage 304. Thereafter, the client device 130, 200 and/or monitoring application 132 transmits or otherwise provides, to each of the WMUs 108, 110, 300 over the wireless network, a command that causes the control modules 302 of the respective WMUs 108, 110, 300 to read or execute the configuration file and apply the measurement configuration parameters and settings to the hardware and/or software associated with the sensor interfaces 308. In this regard, the configuration file may include measurement configuration information (e.g., sampling frequencies, sampling sequences, identifications of which sensor to sample, triggering criteria for samples, and the like), which, in turn, may be utilized by the control modules 302 of the respective WMUs 108, 110, 300 to configure its associated sensors 120, 122, 124, 126 to obtain measurement data in accordance with the monitoring configuration information. In other embodiments, the control modules 302 of a respective WMU 108, 110, 300 may communicate with an associated sensor 120, 122, 124, 126 via a sensor interface 308 to configure that particular sensor 120, 122, 124, 126 for operation in accordance with the monitoring configuration information (e.g., programming the sampling frequency of a particular sensor 120, 122, 124, 126).

It should be noted that in lieu of a configuration file, the client device 130, 200 and/or monitoring application 132 may transmit or otherwise provide configuration command signals to the WMUs 108, 110 via the wireless network or otherwise interact with the WMUs 108, 110 to command, configure, or otherwise program the desired settings for obtaining measurement data from the respective sensors 120, 122, 124, 126 into the WMUs 108, 110 and/or sensors 120, 122, 124, 126. Thus, in some embodiments, a command or request transmitted by client device 130, 200 may include one or more measurement parameters or settings to be implemented or otherwise utilized by the WMUs 108, 110 and/or sensors 120, 122, 124, 126 for the next iteration of measurements. Accordingly, in some embodiments, the WMUs 108, 110 and/or sensors 120, 122, 124, 126 are dynamically configured (or reconfigured) on a command-by-command basis.

After configuring the sensor management modules to support the monitoring configuration information, the distributed monitoring process 400 continues by receiving or otherwise obtaining measurement data from the distributed sensors in accordance with the monitoring configuration information (task 406). In this regard, the client device 130, 200 and/or monitoring application 132 receives measurement data obtained by the sensors 120, 122, 124, 126 over the wireless network via the WMUs 108, 110, with the measurement data being sampled or otherwise obtained as prescribed by the monitoring configuration information. In some embodiments, the WMUs 108, 110 may support autonomous or automated sampling of the sensors 120, 122, 124, 126 according to the measurement configuration information from the configuration files and buffer or otherwise store the corresponding measurement data samples until requested by the client device 130, 200 and/or monitoring application 132. Thus, if satisfaction of a triggering criterion is detected or otherwise identified (e.g., the rotorcraft 102 reaching a particular altitude, airspeed, or the like), a WMU 108, 110 may automatically initiate obtaining the desired number of contemporaneous measurement data samples from its associated sensors 120, 122, 124, 126 with a desired sampling frequency, sequence or ordering, and the like and store the measurement data samples in memory 304 until measurement data is requested by the client device 130, 200 and/or the monitoring application 132. That said, in other embodiments, the WMUs 108, 110 may automatically upload or transfer measurement data samples as they are received back to the client device 130, 200 and/or the monitoring application 132 via the wireless network.

In various embodiments, the WMUs 108, 110 may initiate sampling in response to receiving a command or request from the client device 130, 200 and/or the monitoring application 132. For example, in one embodiment, the monitoring application 132 may store or otherwise maintain triggering criteria associated with the monitoring configuration information and then monitor status information associated with the rotorcraft 102 to detect or otherwise identify when a triggering criterion is satisfied. In this regard, the client device 130, 200 and/or the monitoring application 132 may communicate with a navigation system, a flight management system, one or more onboard avionics systems and the like to monitor the current operational status of the rotorcraft 102. When the current status satisfies a sampling triggering criterion, the monitoring application 132 transmits or otherwise provides a measurement request to one or more of the WMUs 108, 110, which, in turn, initiates sampling of its associated sensors 120, 122, 124, 126 according to the previously configured measurement configuration information and provides corresponding measurement data back to the monitoring application 132 via the wireless network. Additionally, the monitoring application 132 may provide a GUI display including one or more GUI elements adapted to allow a user to manually initiate sampling. In response to a user input to obtain measurement data, the monitoring application 132 transmits or otherwise provides a measurement request to one or more of the WMUs 108, 110, which in turn, provide corresponding measurement data as described above.

In one or more embodiments, the monitoring configuration allows the client device 130, 200 and/or the monitoring application 132 to synchronize measurements across WMUs 108, 110. For example, the configuration file may allow the control module 302 of the WMUs 108, 110, 300 to receive or otherwise identify a broadcast measurement request on the wireless network. In this regard, a broadcast measurement request is a message broadcast by the client device 130, 200 and/or the monitoring application 132 that does not necessarily designate or identify a particular WMU 108, 110 or includes a special header or other encoding that indicates each of the WMUs 108, 110 should act on the request. Thus, an individual request transmitted by the client device 130, 200 and/or the monitoring application 132 may initiate sampling by multiple WMUs 108, 110 substantially simultaneously or concurrently. Moreover, by configuring the sampling frequencies, sampling sequences or orders, and the like associated with sampling the sensors 120, 122, 124, 126, samples from a particular sensor 120, 122, 124, 126 may be effectively synchronized with those of another corresponding sensor 120, 122, 124, 126 of the same type associated with a different WMU 108, 110. For example, tachometers associated with different WMUs 108, 110 may be sampled at substantially the same time in response to a broadcast measurement request.

In one or more exemplary embodiments, the WMUs 108, 110 generate and provide a formatted measurement file containing the raw measurement data captured by the respective sensors 120, 122, 124, 126 that includes a header, which indicates the measurement configuration or settings associated with the raw measurement data encapsulated in the file. In this regard, the measurement configuration information in the header may be utilized by the monitoring application 132 to interpret the raw measurement data contained in the formatted measurement file, for example, by assigning appropriate sampling times or other temporal or sequential attributes to individual samples contained within the measurement file. Thus, the measurement configuration information contained in the header of the formatted measurement file may be influenced by or otherwise correspond to the commanded measurement configuration provided by the client device 130 and/or the monitoring application 132.

In the illustrated embodiment, the distributed monitoring process 400 continues by characterizing or otherwise determining the status of various mechanical components of the rotorcraft at the mobile device based on the measurement data and generating or otherwise providing graphical representations or indicia of the status at the mobile device (tasks 408, 410). The monitoring application 132 analyzes or otherwise processes the measurement data to identify or otherwise determine the status of the mechanical component(s) of the vehicle based on their observed operational characteristic(s) during the operation. In this regard, for a respective mechanical component of the rotorcraft 102, the monitoring application 132 calculates or otherwise determines a metric representative of the relative health of that mechanical component based on the raw measurement data corresponding to the operational characteristics of that mechanical component (e.g., measurement data from the sensors 120, 122, 124, 126 proximate that component) using one or more diagnostic algorithms.

For example, the monitoring application 132 may obtain voltage measurement data samples from an onboard acceleration or vibrational sensor (e.g., where the voltage measurements are proportional to the physical excitation), perform a time-synchronous resample proportional to the rotation of a gear in a drive assembly, provide the resampled measurement data to a gear health algorithm that outputs a metric indicative of the health of the gear (or gearbox), compare the metric to one or more applicable thresholds to ascertain the current condition of the gear (or gearbox), and then characterize the current health status of the gear (or gearbox) accordingly. As another example, the monitoring application 132 may perform a fast Fourier transform on the measurement data samples, detect a peak frequency around the speed of an engine turbine of the drive assembly, compare the detected frequency to one or more applicable thresholds to ascertain the current condition of the engine, and then update the current health status of the engine accordingly. In yet another embodiment, the monitoring application 132 may obtain raw voltage measurement data samples for a particular number of revolutions of a main rotor of a rotor assembly, perform a digital filter transformation to obtain the amplitude and phase of the fundamental vibration of the main rotor, provide the amplitude and phase to a rotor health algorithm that outputs a metric indicative of the health of the rotor, compare the metric to one or more applicable thresholds to ascertain the current condition of the rotor, and then characterize the current health status of the main rotor of the rotor assembly accordingly.

For each respective mechanical component being monitored, the monitoring application 132 may classify or categorize the health of that mechanical component based on the metric indicative of its relative health and then display a graphical indication of the relative health of the particular mechanical component on the client device 130, 200 and/or display device 210. In some embodiments, a visually distinguishable characteristic may be utilized to indicate the relative health of a component. For example, a green-colored indicator may be utilized to indicate a healthy status, a red-colored indicator may be utilized to indicate an unhealthy status that requires maintenance, a yellow-colored indicator may be utilized to indicate a questionable health status that may need attention, and so on. For example, if the metric indicative of the health of a gearbox in a drive assembly is above a first threshold value, the monitoring application 132 may identify the gearbox as being healthy and indicate the gearbox is healthy (e.g., by displaying a green-colored indicator associated with the gearbox). Conversely, if the metric indicative of the health of a gearbox in the drive assembly is above a second threshold value, the monitoring application 132 may identify the gearbox as being elevated and indicate the gearbox is unhealthy (e.g., by displaying a yellow-colored indicator for the health of the gearbox to indicate an unhealthy status). The graphical representations of the component health indicate those mechanical components that may need attention or further evaluation of continued operation (e.g., to verify compliance with applicable regulatory and/or operations guidelines). It should be appreciated there are numerous ways to classify, categorize and/or indicate the relative health of a particular mechanical component, and the subject matter described herein is not intended to be limited to any particular classification or display scheme.

In the illustrated embodiment, the distributed monitoring process 400 continues by transferring or otherwise uploading measurement data and/or health status data from the mobile device to a remote device (task 412). For example, the user may manipulate the monitoring application 132 to upload or transmit measurement data obtained from the WMUs 108, 110 and/or the corresponding health status data determined by the monitoring application 132 to the remote server 134 via the network 138 for storage in the database 136 and/or further analysis at the remote server 134. In this regard, the remote server 134 may store or manage flight logs for the rotorcraft 102 that allows for analysis of the relative health of the mechanical components of the rotorcraft 102 over time based on the measurement data and/or status data from various flights to identify historical trends, perform predictive health or maintenance analysis, or the like. In some embodiments, the remote server 134 may also provide more robust historical health analysis or trend data back to the client device 130, 200 for presentation on the display device 210 by the monitoring application 132, thereby allowing a user onboard the rotorcraft 102 to review this information on the client device 130, 200.

Referring to FIGS. 1-4, the subject matter described herein allows for HUMS features and functionality to be implemented at a mobile device as part of a monitoring system that includes wireless sensor management modules distributed about a vehicle and supporting multiple different sensors mounted or positioned at or near different mechanical components of a vehicle. Thus, dedicated HUMS hardware and cabling is not required to be installed, which is advantageous for small helicopters and other rotorcraft were various weight and size restrictions may exist. The mobile device allows a user to configure the HUMS measurements at the mobile device, and then distributed the measurement configuration parameters across the different sensor management modules, thereby allowing the user of the mobile device to control the manner in which the outputs of the sensors are sampled to obtain measurement data. The mobile device may also configure the different sensor management modules to support synchronization of sampling across the sensor management modules in response to a measurement request broadcast by the mobile device, which, in turn allows measurements from different locations to be temporally associated with one another for analysis.

The HUMS application at the mobile device characterizes the mechanical components based on the corresponding measurement data obtained from the sensors disposed proximate to or mounted near the respective mechanical components and then provides corresponding graphical indicia of the health or condition of the different mechanical components at the mobile device. Thus, a user can quickly and conveniently ascertain the condition of the various vehicle components. Additionally, the mobile device may be utilized to upload measurement data to a remote device via a separate network that the sensor management modules do not communicate on, or alternatively, to download other historical measurement or analysis data that may not be available at the mobile device from the remote device. Thus, a user can quickly and conveniently perform a historical analysis of the health or condition of the different mechanical components using the mobile device in addition to being apprised of the current health or condition, thereby allowing for more informed choices regarding maintenance or other remedial actions to be made by the user.

For the sake of brevity, conventional techniques related to rotor track and balance, health and usage monitoring, onboard sensor systems, wireless networking, sampling, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A monitoring system for a plurality of mechanical components of a vehicle, the monitoring system comprising:
   a plurality of management modules onboard the vehicle, each management module of the plurality of management modules being coupled to one or more sensing arrangements mounted onboard the vehicle to provide measurement data corresponding to a respective mechanical component of the plurality of mechanical components; and
   a mobile device communicatively coupled to the plurality of management modules over a wireless network to:
   configure the plurality of management modules for sampling the one or more sensing arrangements to obtain the measurement data in accordance with monitoring configuration information;
   broadcast a broadcast measurement request on the wireless network to synchronize the measurement data from the plurality of management modules;
   receive a plurality of measurement files including the measurement data from the plurality of management modules over the wireless network, each measurement file of the plurality of measurement files including a header formatted with measurement configuration information;
   utilize the measurement configuration information to interpret the measurement data and assign sampling times, temporal attributes, or sequential attributes to individual samples contained within a respective measurement file; and
   for each mechanical component of the plurality of mechanical components:
   determine, at the mobile device, a condition of the respective mechanical component based on the interpreted measurement data corresponding to the respective mechanical component; and
   display, at the mobile device, a graphical representation of the condition of the respective mechanical component.

2. The monitoring system of claim 1, wherein the mobile device configures the plurality of management modules by transmitting a respective configuration to each of the plurality of management modules over the wireless network and instructing each of the plurality of management modules to implement measurement configuration information contained in the respective configuration.

3. The monitoring system of claim 2, wherein the measurement configuration information includes at least one of a sampling order for the one or more sensing arrangements associated with the respective management module, a sampling frequency for sampling one of the one or more sensing arrangements associated with the respective management module, a sampling duration for sampling one of the one or more sensing arrangements associated with the respective management module, a triggering criterion for sampling one of the one or more sensing arrangements associated with the respective management module, and a gain factor for one of the one or more sensing arrangements associated with the respective management module.

4. The monitoring system of claim 2, wherein the measurement configuration information includes synchronization information for synchronizing the measurement data from the respective management modules.

5. The monitoring system of claim 1, further comprising an onboard system providing current status information for the vehicle, wherein the mobile device receives the current status information from the onboard system and transmits the broadcast measurement request based at least in part on the current status information.

6. The monitoring system of claim 1, further comprising a remote device communicatively coupled to the mobile device over a second communications network separate from the wireless network, wherein the mobile device uploads the measurement data to the remote device over the second communications network.

7. The monitoring system of claim 1, further comprising a remote device communicatively coupled to the mobile device over a second communications network separate from the wireless network, wherein the mobile device receives the monitoring configuration information from the remote device over the second communications network.

8. The monitoring system of claim 1, wherein the mobile device comprises a user input device to receive the monitoring configuration information.

9. The monitoring system of claim 1, wherein the vehicle comprises a rotorcraft.

10. The monitoring system of claim 1, wherein each management module of the plurality of management modules is coupled to each of the one or more sensing arrangements associated with the respective management module via a respective electrical connection.

11. The monitoring system of claim 1, wherein each management module of the plurality of management modules samples the respective one or more sensing arrangements associated with the respective management module substantially synchronously with one or more other management modules of the plurality of management modules.

12. The monitoring system of claim 1, wherein the vehicle comprises a helicopter and the mobile device determines the condition of a rotor assembly of the helicopter by performing rotor track and balance analysis using the measurement data from the management module of the plurality of management modules that is coupled to one or more sensing arrangements mounted onboard the helicopter to provide the measurement data corresponding to the rotor assembly.

13. The monitoring system of claim 1, wherein the mobile device is configured to execute a health and usage monitoring systems (HUMS) application at the mobile device, the HUMS application being configured to:
utilize the measurement configuration information to interpret the measurement data; and
for each mechanical component of the plurality of mechanical components:
determine a health of the respective mechanical component based on the measurement data corresponding to the respective mechanical component; and
display a graphical representation of the health of the respective mechanical component.

14. A method of monitoring health of a plurality of mechanical components of a vehicle, the method comprising:
configuring, by a mobile device using a wireless network associated with the vehicle, measurement parameters of a plurality of sensor management units onboard the vehicle, wherein each sensor management unit of the plurality of sensor management units includes one or more sensor interfaces coupled to one or more sensors via one or more electrical connections and each sensor management unit utilizes its respective measurement parameters for obtaining measurement data from the one or more sensors at the one or more sensor interfaces;
broadcasting, by the mobile device on the wireless network, a broadcast measurement request to the plurality of sensor management units, wherein the one or more measurement parameters configure synchronizing the measurement data from the one or more sensors across the plurality of sensor management units in response to the broadcast measurement request;
receiving, at the mobile device, a plurality of measurement files comprising the measurement data from the plurality of sensor management units over the wireless network wherein each measurement file of the plurality includes measurements from the one or more sensors associated with the respective sensor management unit and includes a header formatted with measurement configuration information;
utilizing, at the mobile device, the measurement configuration information to interpret the measurement data and assign sampling times, temporal attributes, or sequential attributes to individual samples contained within a respective measurement file;
determining, at the mobile device, conditions of the plurality of mechanical components based on the interpreted measurement data; and
providing, at the mobile device, indicia of the conditions of the plurality of mechanical components.

15. The method of claim 14, further comprising executing a health and usage monitoring systems (HUMS) application at the mobile device, wherein:
the HUMS application utilizes the measurement configuration information to interpret the measurements and determine the conditions of the plurality of mechanical components based on the interpreted measurements.

16. The method of claim 14, wherein:
configuring the measurement parameters comprises the mobile device transmitting a respective configuration file to each of the plurality of sensor management units onboard the vehicle; and
each of the plurality of sensor management units stores the respective configuration file.

17. The method of claim 16, further comprising the mobile device instructing each of the plurality of sensor management units to read or execute the respective configuration file stored at the respective sensor management unit.

18. A non-transitory computer-readable medium having instructions stored thereon that are executable by a processing system of the mobile device to perform the method of claim 14.

19. A method of monitoring health of a plurality of mechanical components of a rotorcraft using a plurality of sensor management modules distributed about the rotorcraft, each of the sensor management modules being communicatively coupled to a wireless network associated with the rotorcraft and each of the sensor management modules being associated with a set of one or more sensing arrangements for obtaining measurement data corresponding to a respective one of the plurality of mechanical components, the method comprising:
providing, by a mobile device communicatively coupled to the wireless network, measurement configuration settings to each of the plurality of sensor management modules, wherein each of the plurality of sensor management modules obtains measurements from its set of sensing arrangements in accordance with its measurement configuration settings provided by the mobile device;
broadcasting, by the mobile device on the wireless network, a broadcast measurement request to the plurality of sensor management modules, wherein the measurement configuration settings configure synchronizing the measurements from each of the plurality of sensor management modules in response to the broadcast measurement request;
receiving, at the mobile device over the wireless network, a plurality of measurement files comprising the measurements from each of the plurality of sensor management modules, wherein each measurement file of the plurality includes measurements from the one or more sensing arrangements associated with the respective sensor management module and includes a header formatted with measurement configuration information;
utilizing, at the mobile device, the measurement configuration information to interpret the measurements and assign sampling times, temporal attributes, or sequential attributes to individual samples contained within a respective measurement file;

characterizing, at the mobile device, a health of each of the plurality of mechanical components based on respective interpreted measurements from the respective sensor management module corresponding to the respective mechanical component; and displaying, at the mobile device, an indication of the health of each of the plurality of mechanical components.

* * * * *